United States Patent [19]
Buckland et al.

[11] Patent Number: 5,660,345
[45] Date of Patent: Aug. 26, 1997

[54] TAPE DRIVE WITH MOVABLE CARTRIDGE DOOR OPENING MECHANISM

[75] Inventors: Kurt A. Buckland, Yorba Linda; Walter Fehlmann, Fountain Valley; Ashok B. Nayak, Glendora, all of Calif.

[73] Assignee: Seagate Technology, Inc., Scotts Valley, Calif.

[21] Appl. No.: 557,770

[22] Filed: Nov. 13, 1995

[51] Int. Cl.⁶ .................................................. G11B 15/66
[52] U.S. Cl. ................................................... 242/338
[58] Field of Search ............................ 242/336, 338; 360/93, 94, 96.5

[56] References Cited

U.S. PATENT DOCUMENTS

| | | | |
|---|---|---|---|
| 4,556,923 | 12/1985 | Olmsted | 360/93 |
| 4,586,095 | 4/1986 | Olmsted | 360/93 |
| 5,109,308 | 4/1992 | Kukreja et al. | 360/93 |
| 5,237,469 | 8/1993 | Kukreja et al. | 360/93 |
| 5,485,326 | 1/1996 | Chiou | 360/96.5 |

*Primary Examiner*—John P. Darling
*Attorney, Agent, or Firm*—Lowe, Price, LeBlanc & Becker

[57] ABSTRACT

A tape drive for accommodating tape cartridges of different sizes and capacities is provided with a drive mouth and a movable door opening mechanism within the drive mouth. The movable door opening mechanism opens a cartridge door of a tape cartridge as it is inserted into the drive mouth. The movable door opening mechanism remains in a first position during initial insertion of a tape cartridge until the cartridge door of the tape cartridge is open, and moves to a second position during further insertion of the tape cartridge to accommodate that tape cartridge within the drive mouth.

19 Claims, 18 Drawing Sheets

TAPE DRIVE WITH MOVABLE CARTRIDGE DOOR OPENING MECHANISM

FIELD OF THE INVENTION

The present invention relates to the field of tape drives, and more particularly, to a novel tape drive that can accommodate tape cartridges of different sizes.

BACKGROUND OF THE INVENTION

Conventional tape drives, such as those used in data archival tape systems, are designed for use with a standard size tape cartridge, such as that depicted in FIG. 1. Exemplary dimensions of the tape cartridge 10 are 8 cm wide ($W_I$) by 6 cm deep (arrows D) and 1.4 cm high. The tape cartridge 10 has two tape reels 12 which are driven by a drive capstan 14. Guide posts 15 guide the tape 17 from the reels past a cartridge door 16. The cartridge door 16 is provided on the front end of the tape cartridge 10 and is pivoted around a pivot 18 to swing open in the direction of arrow 19. When the cartridge door 16 is open, the tape 17 is exposed to a recording head (not illustrated) for recording on the tape 17.

FIGS. 3–5 depict a portion of a standard tape drive 21 and the insertion of the standard tape cartridge 10 into that drive. The tape drive 21 has a mouth 23, and a stationary door opener 25 within the mouth 23. The sequence of FIGS. 3–5 demonstrate the pivoting of the cartridge door 16 upon insertion of the tape cartridge 10 by the door opener 25 when the outer edge 20 of the cartridge door 16 is pushed against the door opener 25. In FIG. 3, the tape cartridge 10 is about to be inserted into the drive, positioned in alignment with the drive mouth 23. As the cartridge 10 enters the drive 21, shown in FIG. 4, the cartridge door 16 begins to pivot open as it is brought into contact with opener 25. Once the cartridge door 16 is open and the tape cartridge 10 fully inserted (FIG. 5), the tape 17 in the tape cartridge 10 is exposed to recording head 27.

With increases in system memory capacity, there is a need for increased archival capacity. This can be provided by higher capacity tape cartridges, containing a longer tape than contained in the standard tape cartridges 10. Due to the greater length of tape, an increased capacity tape cartridge will necessarily be larger in size than a standard tape cartridge 10. However, tape drives that can accommodate a larger capacity tape cartridge should also be able to accommodate a standard capacity tape cartridge to provide users with the option of which tape cartridge to use in a particular circumstance.

One type of higher capacity tape cartridge has a front end (the load side) that is necked down to 8 cm wide to fit into a standard size drive mouth. A top view of an embodiment of such a tape cartridge with increased archival capacity is depicted in FIG. 2a. This high capacity tape cartridge 30 contains the same internal elements as that of the standard tape cartridge 10 of FIG. 1. Hence, the high capacity tape cartridge 30 has tape reels 32, drive capstan 34, and guide posts 35. The tape cartridge 30 also has a cartridge door 36 pivotally mounted at pivot 38.

FIGS. 2b and 2c depict the outer housing of the high capacity tape cartridge 30. The outer housing has recessed guides 31 formed by longitudinally extending recesses in the top surface of the outer housing. These guides 31 interact with corresponding guiding elements in the door of the tape drive to provide a guiding of the tape cartridge 30 as it is inserted into a tape drive.

The front end 37 (the load end) of the tape cartridge 30 has the same width (e.g., 8 cm) as the front end of the standard tape cartridge 10. However, to provide the increased capacity for holding the longer tape, the housing 40 of the high capacity tape cartridge 30 is both deeper and wider toward the rear end 39 of the cartridge 30. As exemplary dimensions, when the high capacity tape cartridge 30 has an inner width $W_I$ of 8 cm (the same as the width $W_I$ of the standard tape cartridge 10), the outer width $W_O$ is 9.5 cm, and the depth D is 7.2 cm. The height of the high capacity tape cartridge 30 is the same as that of the standard capacity tape cartridge 10.

The widened rear end 39 of the high capacity tape cartridge 30 prevents the tape cartridge 30 from being inserted in a standard tape drive to the extent necessary to fully open the cartridge door 36. In order to insert such a higher capacity tape cartridge 30 into a standard tape drive, a drive mouth 41 must be made wider and a cartridge door opener 43 within the drive mouth 41 must be positioned inwardly toward the recording head 45, such as depicted in FIG. 6a. However, simply making the drive mouth 41 of a tape drive wider and moving the door opener 43 inward to accommodate a larger tape cartridge 30, causes the cartridge door 36 to open too late and hit the recording head 45. FIG. 6b depicts a partially inserted tape cartridge 30, and this late opening of the cartridge door 36.

There is therefore a need for a tape drive that can accommodate both the standard capacity tape cartridges and the higher capacity tape cartridges, and still ensure that the cartridge door of the tape cartridges will clear the recording head as the tape cartridges are inserted into the tape drive.

SUMMARY OF THE INVENTION

This and other needs are met by the present invention which provides a tape drive for accommodating tape cartridges of different sizes and capacities with a drive mouth and a movable door opening mechanism within the drive mouth. The movable door opening mechanism opens a cartridge door of tape cartridges as they are inserted into the drive mouth. The movable door opening mechanism remains in a first position during insertion of a tape cartridge of a first or a second size until the cartridge door is opened and moves to a second position upon further insertion of the tape cartridge.

The use of a door opener that is movable within the drive mouth of a tape drive mechanism allows the door opener to be moved inwardly, but avoids opening the cartridge door too late. Since the door opener is retracted as a result of the insertion of a tape, the tape drive mechanism is able to accommodate different size and capacity tape cartridges. A single tape drive can then be used with either a standard or a high capacity tape cartridge, depending on the needs of the user.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 10 is a schematic side view of the drive mouth of FIG. 8a.

FIG. 11 is an enlarged view of a slide and channel shoulder in the tape drive of FIG. 8a.

DETAILED DESCRIPTION OF AN ILLUSTRATIVE EMBODIMENT

Figure 1:
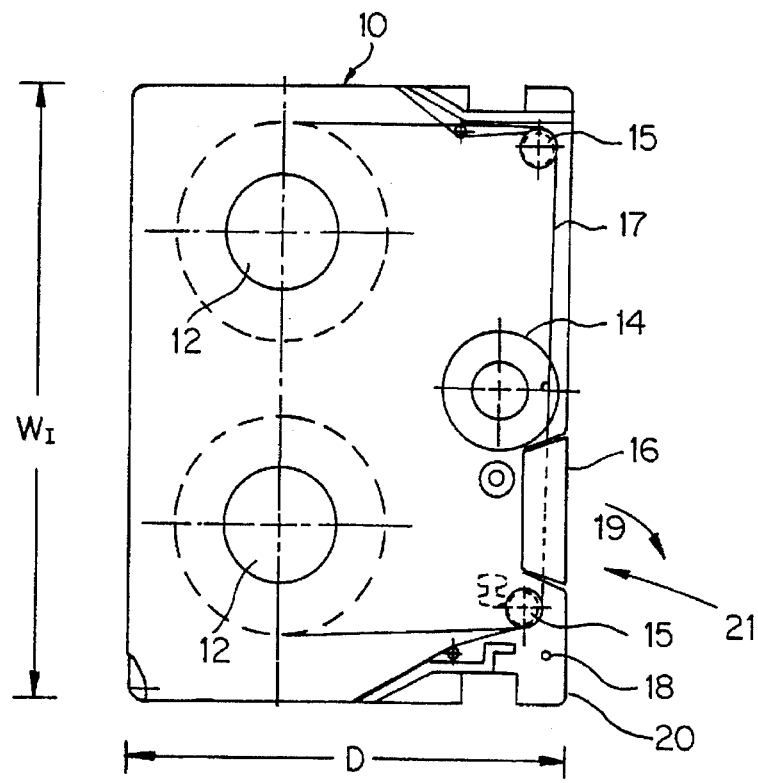
FIG. 1 is a top view of a standard size and capacity tape cartridge.
Figure 2A:
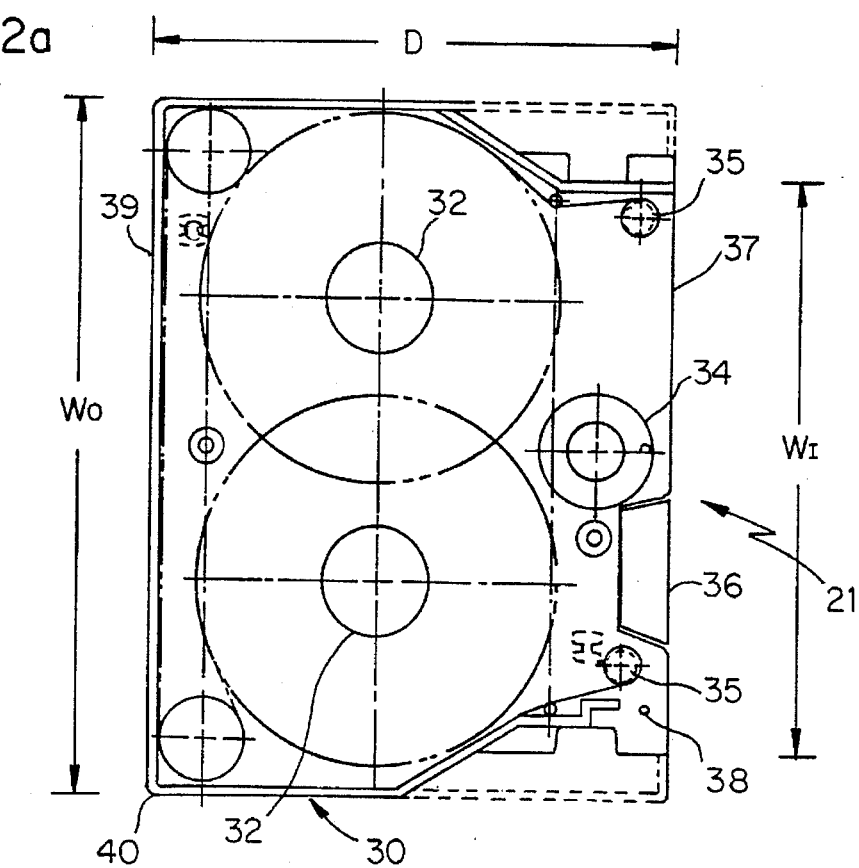
FIG. 2a is a top view of an embodiment of a high capacity tape cartridge.
Figure 2B:
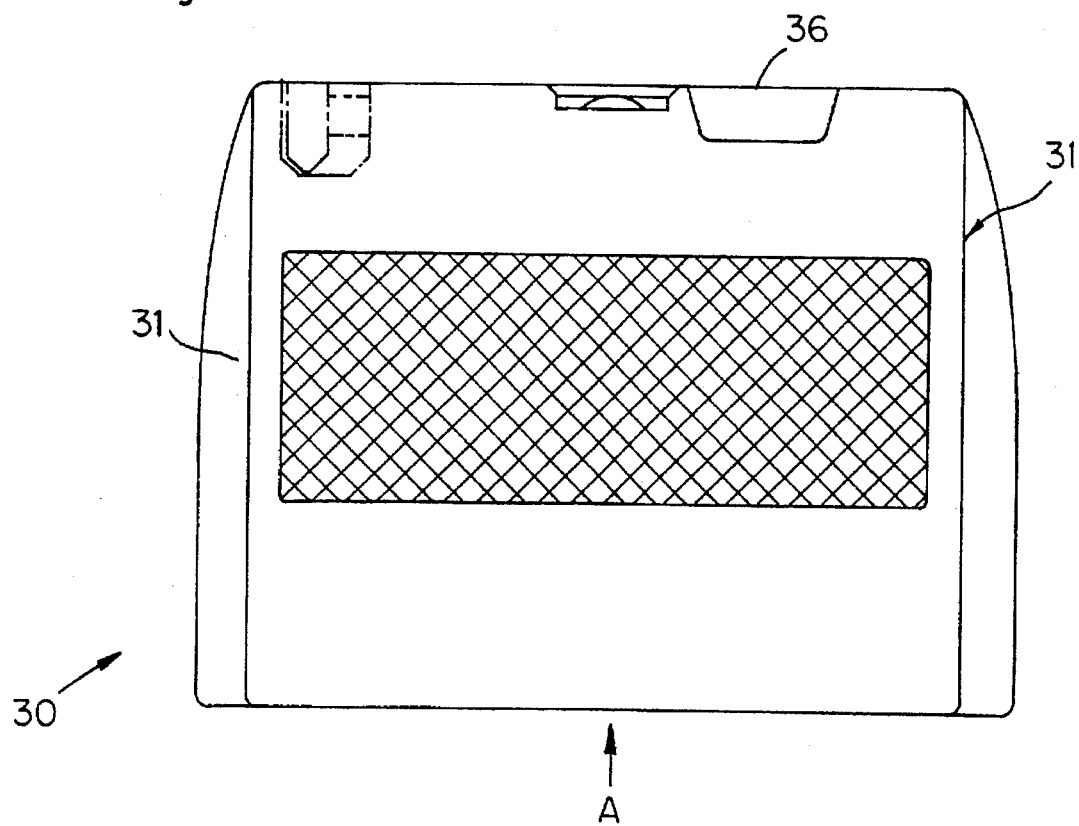
FIG. 2b is a top view of the outer housing of a high capacity tape cartridge.
Figure 2C:
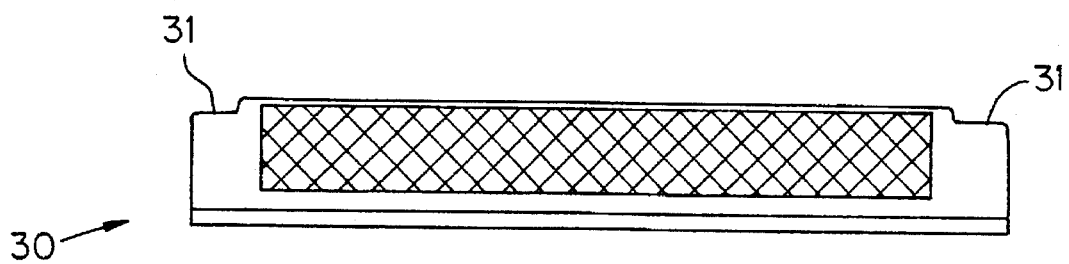
FIG. 2c is an end view taken in the direction of arrow A in FIG. 2b.
Figure 3:
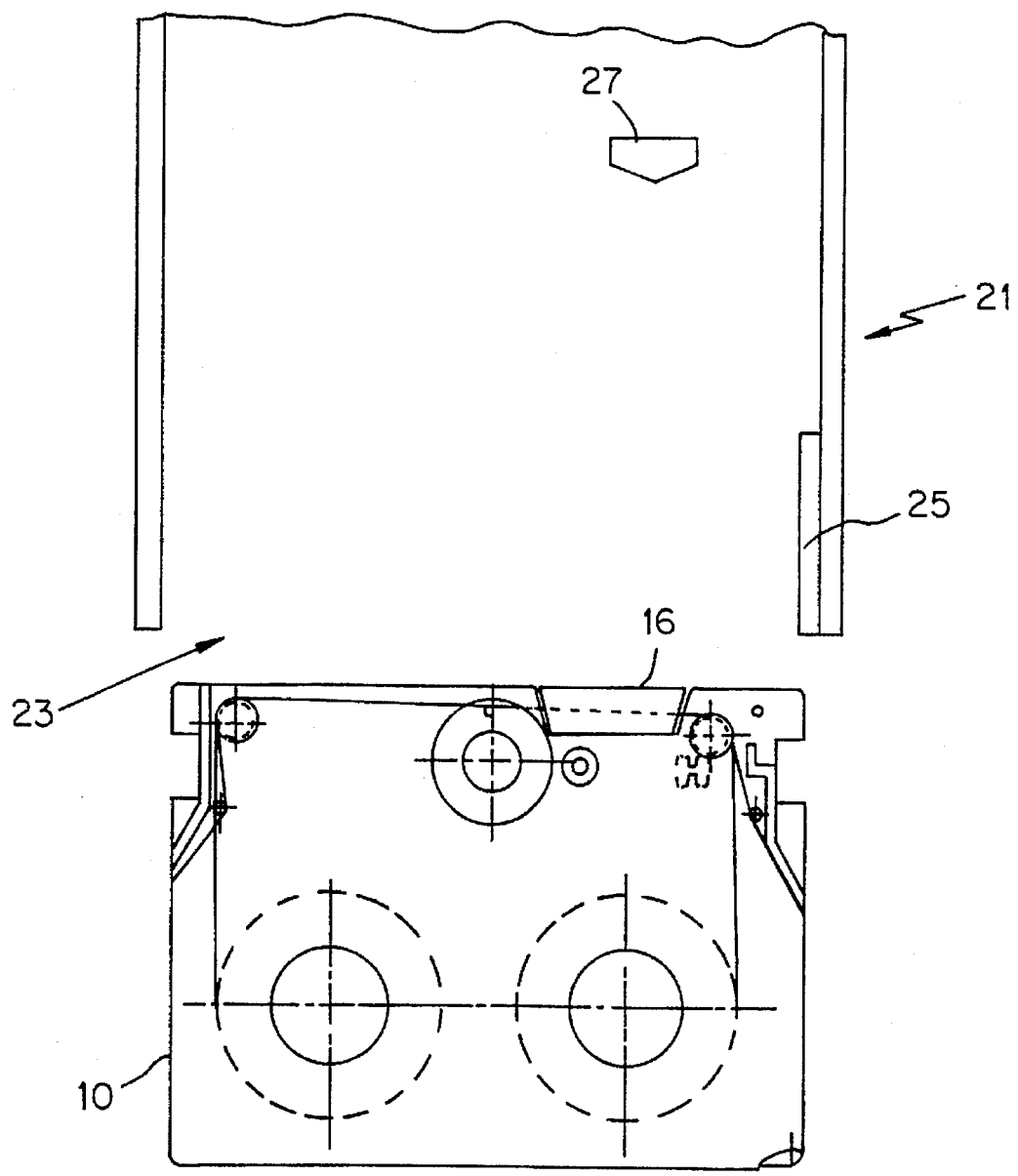
FIG. 3 is a top, cut-away view of the drive mouth of a standard tape drive and standard tape prior to insertion in the tape drive.
Figure 4:
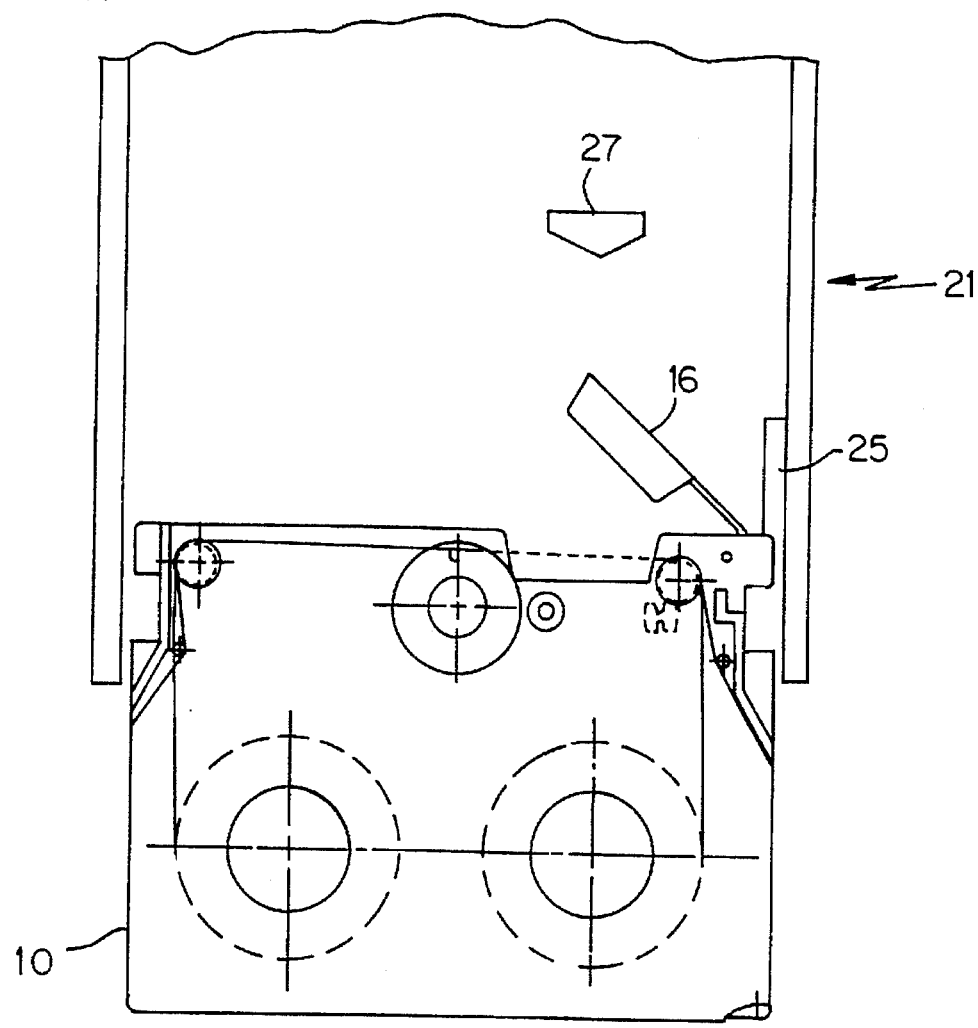
FIG. 4 is a top, cut-away view of the drive mouth of a standard tape drive and standard tape partially inserted in the tape drive.
Figure 5:
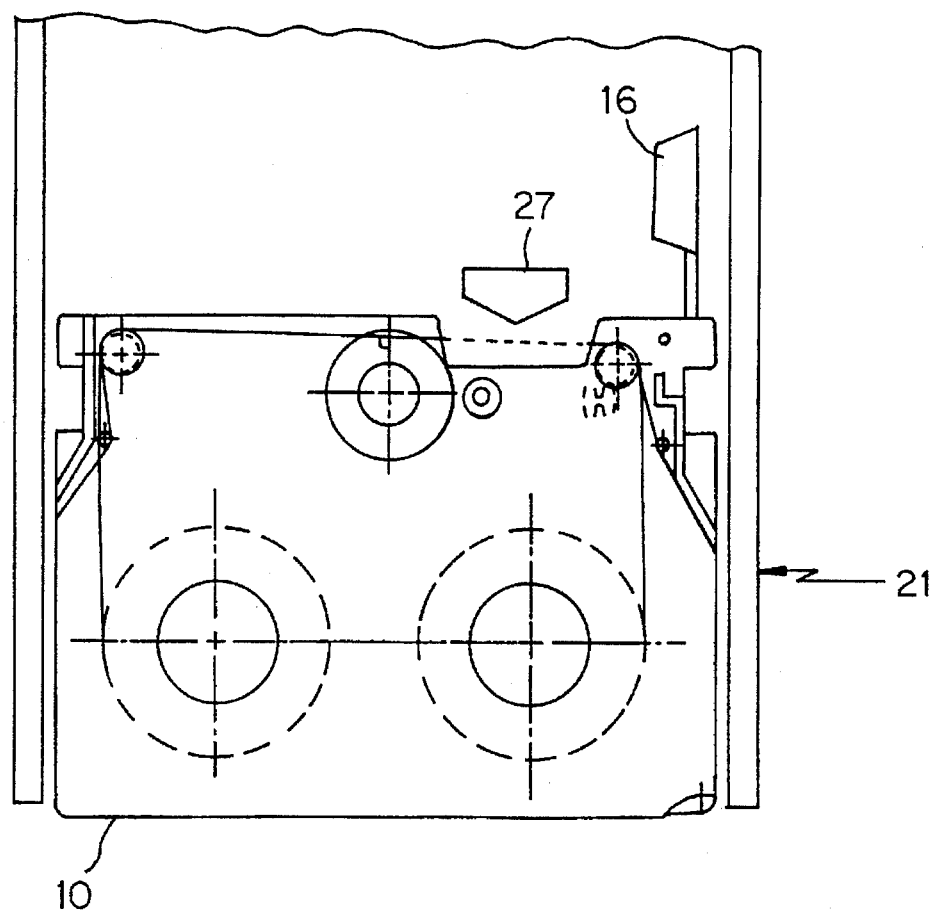
FIG. 5 is a top, cut-away view of the drive mouth of a standard tape drive and standard tape fully inserted in the tape drive.
Figure 6A:
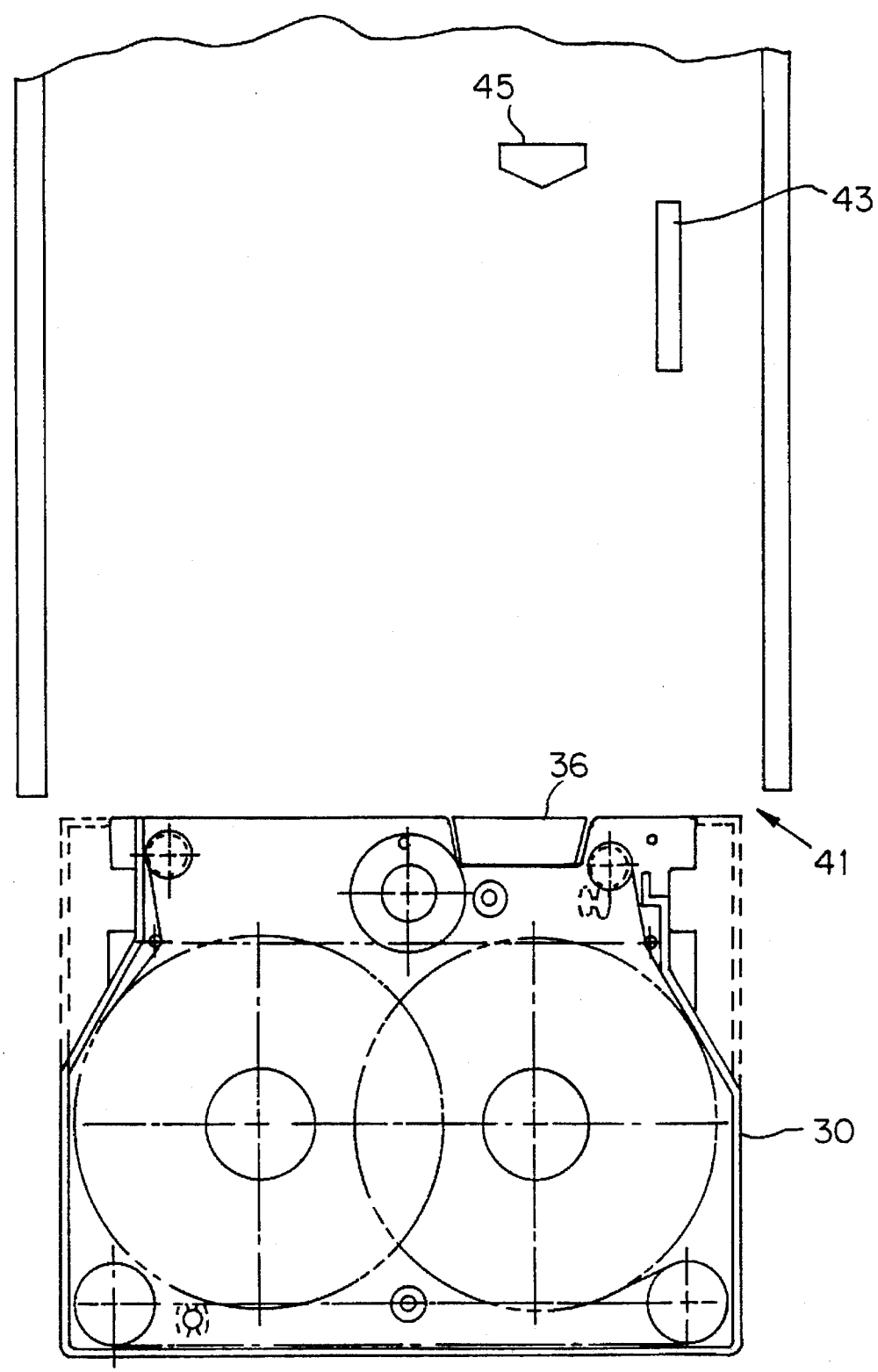
FIG. 6a is a top, cut-away view of a modified standard tape drive prior to the insertion of a tape cartridge.
Figure 6B:
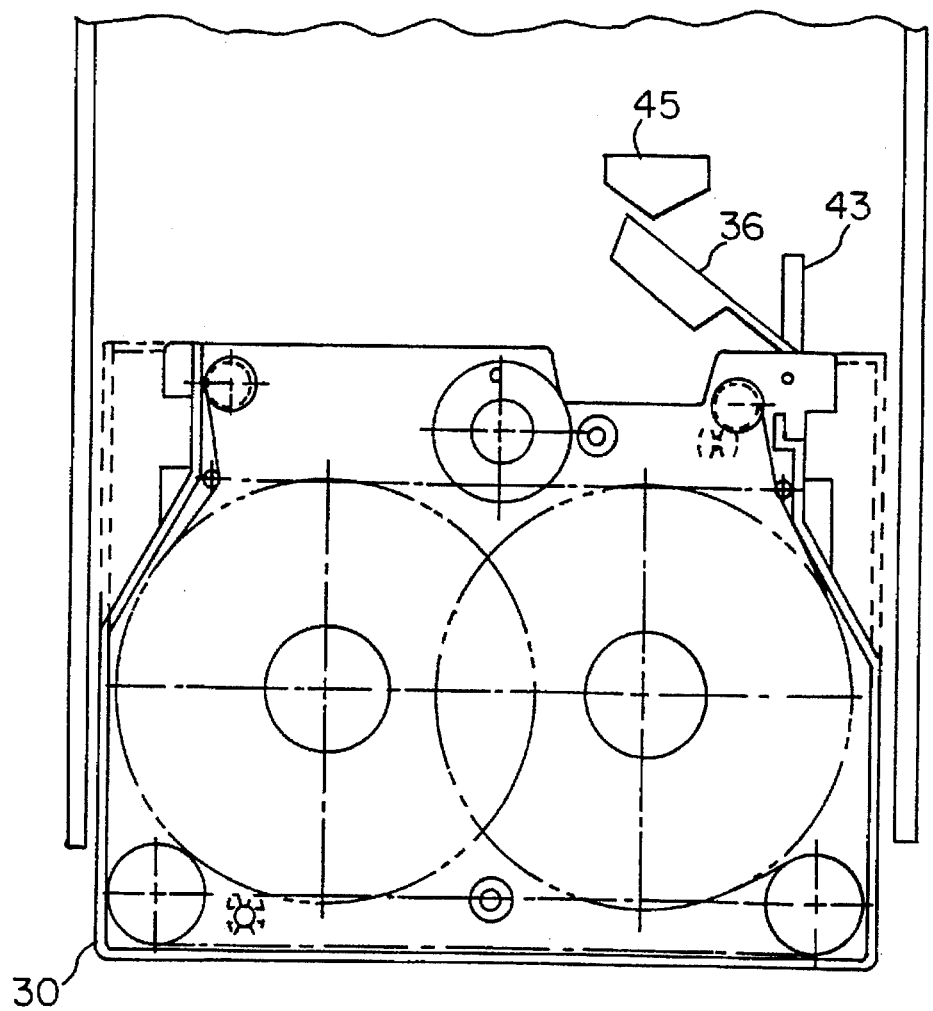
FIG. 6b is a top, cut-away view of the modified standard tape drive of FIG. 6a during attempted insertion of a tape cartridge.
Figure 7A:
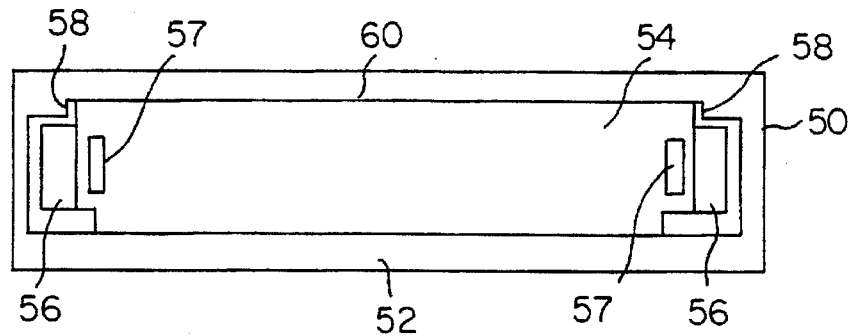
FIG. 7a is a front view of a bezel constructed in accordance with an embodiment of the present invention, for the front of a tape drive, depicted with the bezel door in the closed position.
Figure 7B:
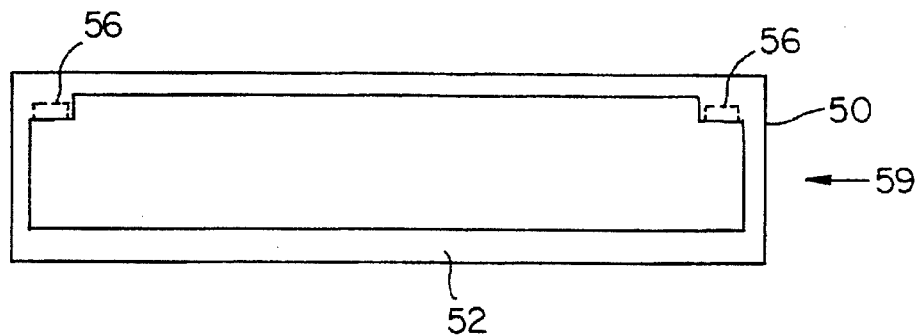
FIG. 7b is a front view of the bezel of FIG. 7a, but is depicted with the bezel door in the fully open position.
Figure 7C:
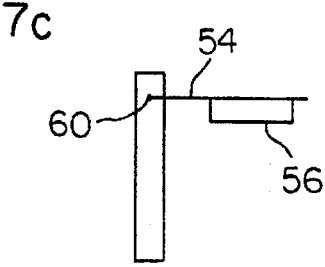
FIG. 7c is a side view of the bezel of FIG. 7a, with the bezel door in the fully open position.

FIGS. 7a and 7b depict a front view of a bezel 50 constructed in accordance with an embodiment of the present invention, and which is located at the drive mouth opening of a tape drive. The bezel 50 has an outer guide 52, which, when the bezel door 54 is swung open on hinge 60, exposes a shape (seen in FIG. 7b) that conforms to the outline of a large capacity cartridge 30. The bezel 50 therefore acts as a guide for the large capacity cartridges 30 as they are inserted.

In addition to the outer guide 52, further guidance of large capacity tape cartridges 30 during insertion are provided by guides 56 that are raised areas on the bezel door 54. The guides 56, when the bezel door 54 is swung open (FIG. 7b), provide longitudinal guides for the large capacity tape cartridges 30 during insertion. The guides 56 ride in corresponding longitudinally extending rails on the tape cartridge 30.

The guides 56 also provide a guidance during the initial insertion of a standard capacity tape cartridge 10, as such a cartridge fits between the two guides 56. Additional guidance of standard capacity tape cartridges is provided by the shoulders 58 in the outer guide 52. A standard capacity tape cartridge 10 has a width that fits between the two shoulders 58.

Figure 8A:
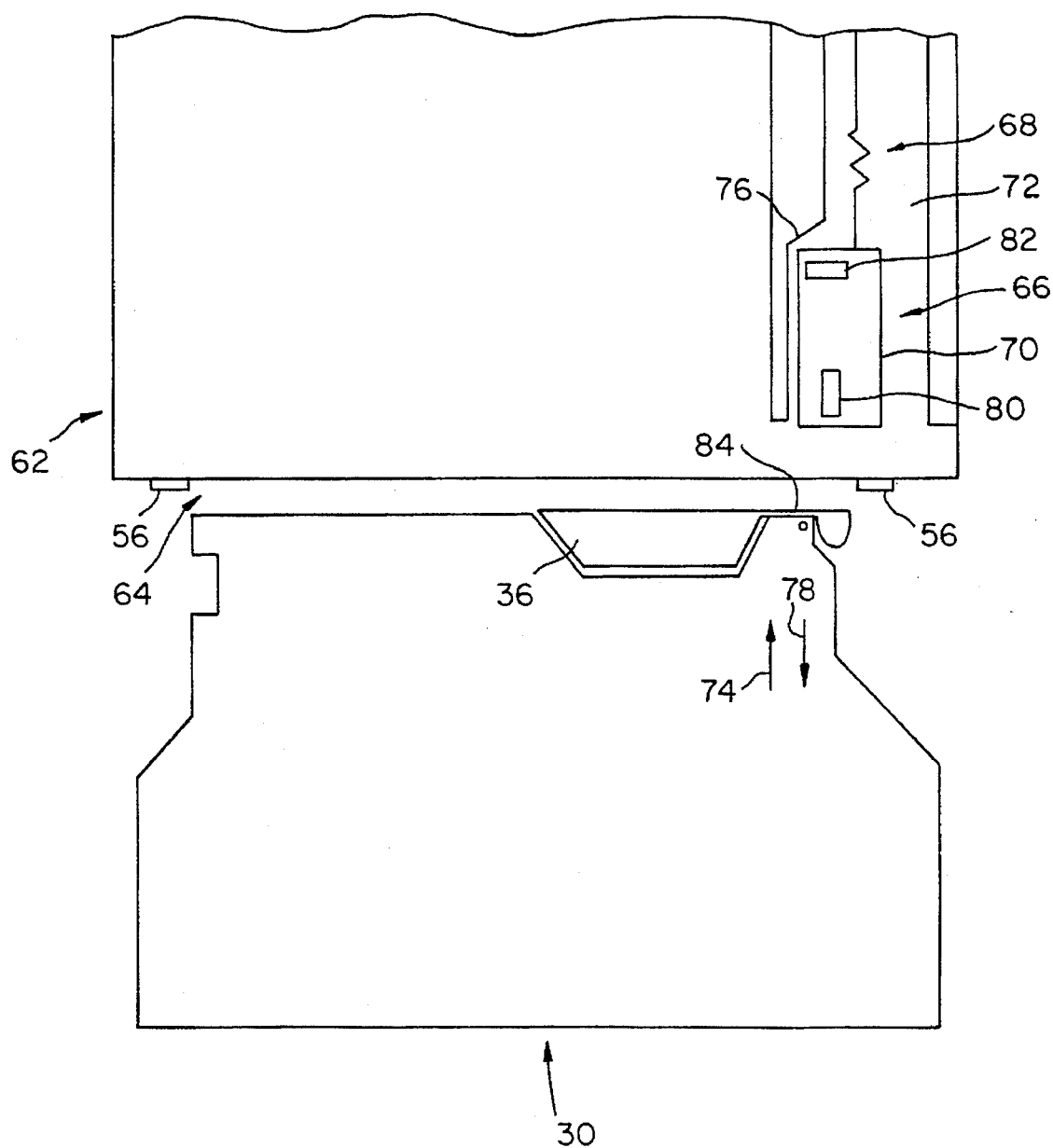
FIG. 8a is a top, cut-away view of the drive mouth of a tape drive constructed in accordance with an embodiment of the present invention, prior to insertion of a tape cartridge.
Figure 10:
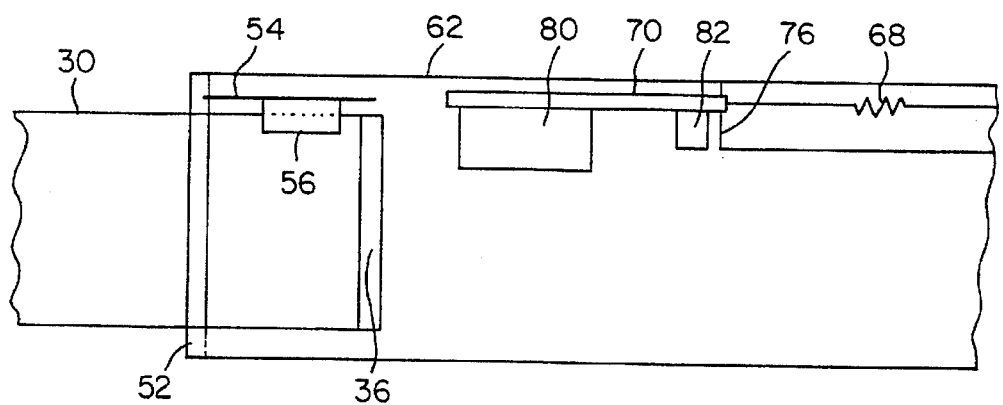

FIG. 8a is a top view of a drive mouth region of a tape drive mechanism 62 constructed in accordance with an embodiment of the present invention. As the other elements of the tape drive mechanism 62 are conventional in nature, these other elements are, for brevity, not illustrated. FIG. 10 is a side view of the relevant portions of the tape drive mechanism 62 and the tape cartridge 30.

The tape drive mechanism 62 has a drive mouth 64 into which standard and high capacity tape cartridges 10, 30 can be inserted. The drive mouth 64 has a width that corresponds to the outer width $W_O$ of the high capacity tape cartridge 30, and is therefore approximately 9.5 cm in certain preferred embodiments.

A door opening mechanism 66 is located in the drive mouth 64 and is depicted in FIG. 8a in an extended position. The door opening mechanism 66 comprises a door opener 80 coupled to a biasing device 68. The biasing device 68 may be a longitudinally extending spring, for example, or a torsion spring, or any other type of device that provides a restoring biasing force in a direction 78 that is opposite to the tape insertion direction 74. The biasing device 68 is coupled to, and acts on, a slide 70 that is movable within a channel 72.

Figure 11:
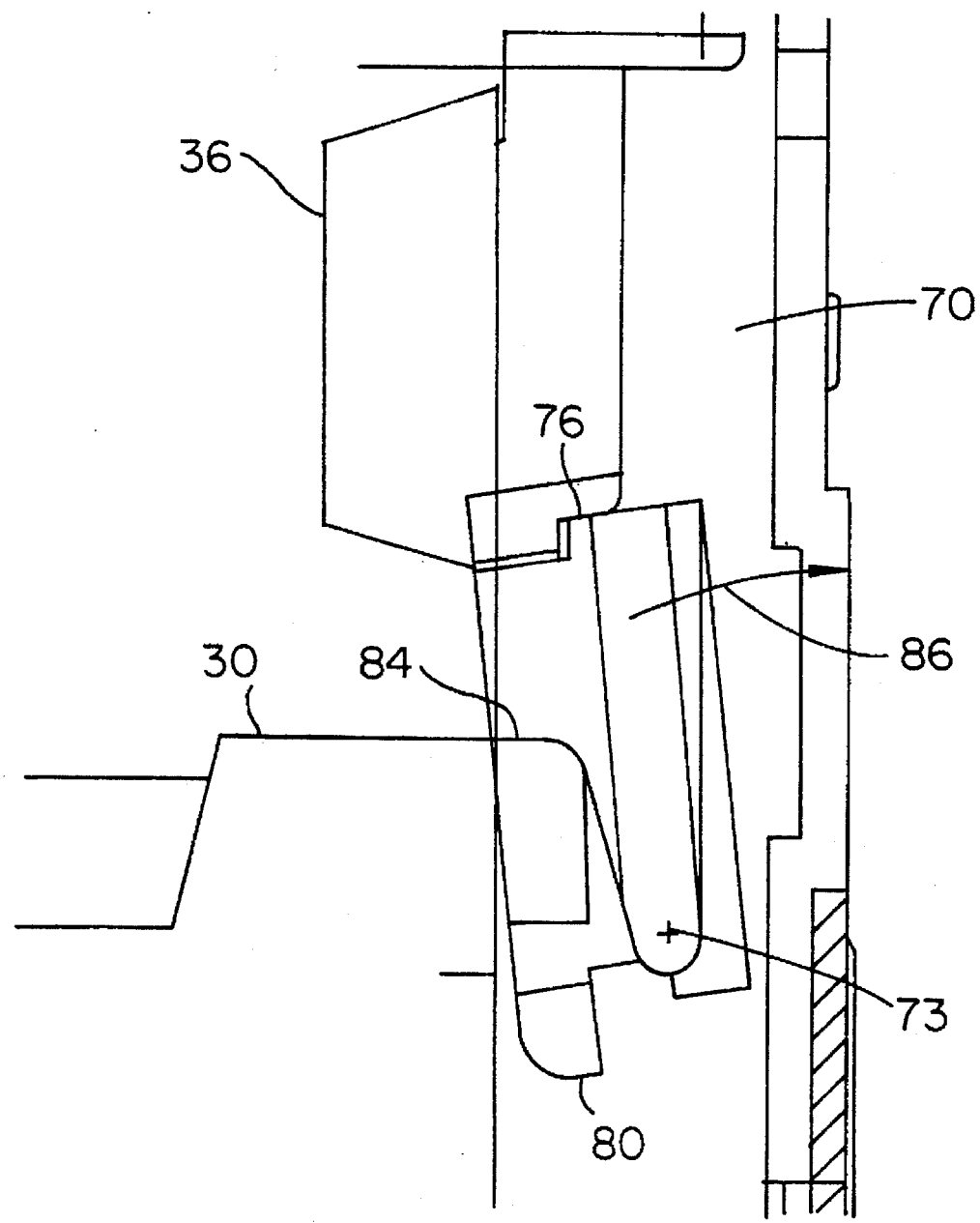

In addition to the biasing device 68, movement of the slide 70 in the tape insertion direction 74 is resisted by a channel shoulder 76. The channel shoulder 76 is at a slight angle to the slide 70, as best seen in the enlargement of FIG. 11, detailing this area. As will be described in more detail later, this resistance is overcome during full insertion of a tape cartridge 10, 30.

Figure 8B:
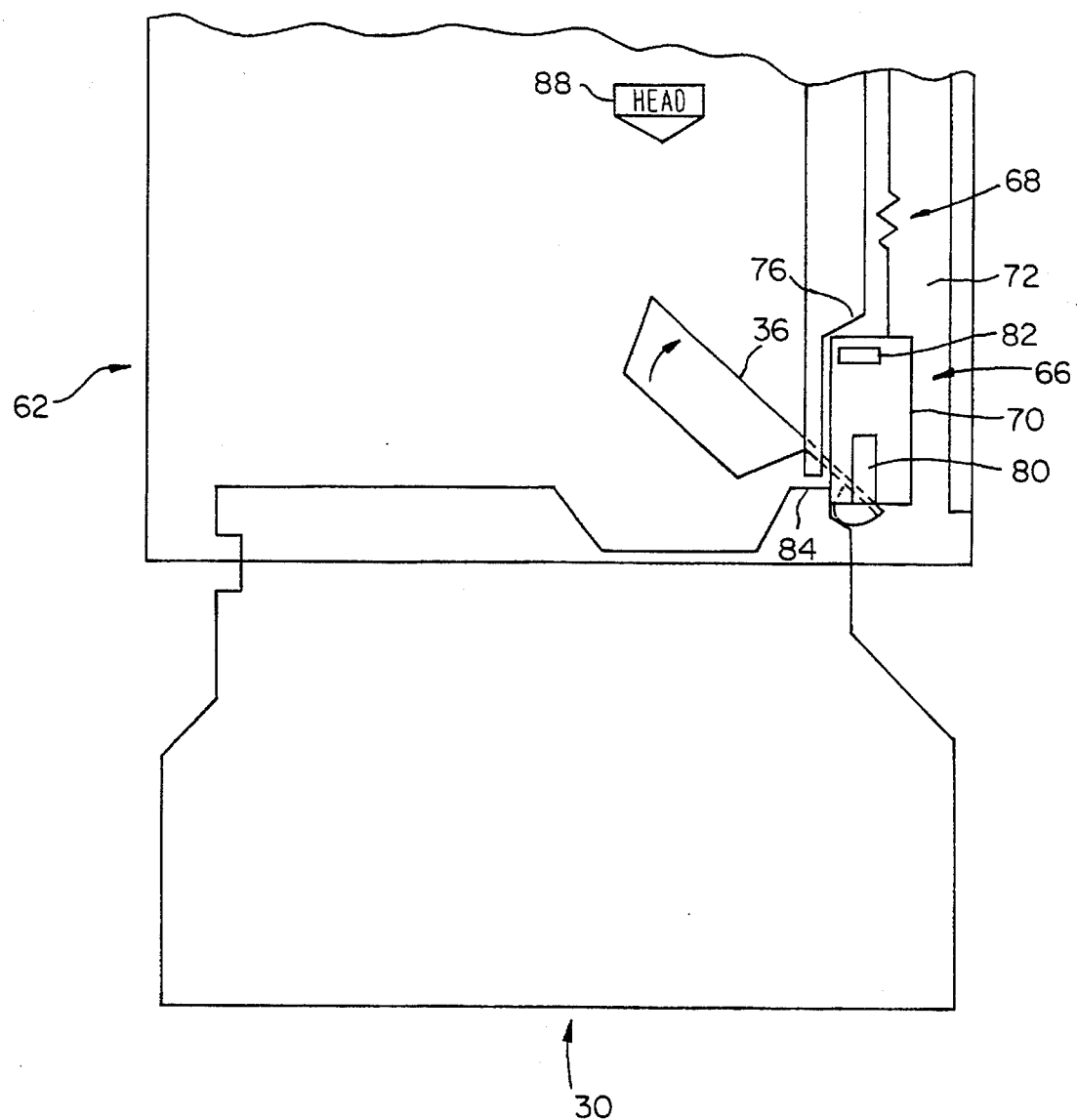
FIG. 8b is a view similar to FIG. 8a, but with the high capacity tape cartridge of FIG. 2 partially inserted into the drive mouth.

The slide 70 has a door opener projection 80 that interacts with the end of a cartridge door 36 to swing open the cartridge door 36 upon insertion of the cartridge 30. See FIG. 8b, which depicts the swinging open of the cartridge door 36 during the initial insertion of a tape cartridge 30. The biasing force exerted by the biasing device 68, and the resistance provided by the channel shoulder 76, maintain the slide 70 in its initial, extended position as the tape cartridge 30 is inserted and the cartridge door 36 is swung open.

Figure 8C:
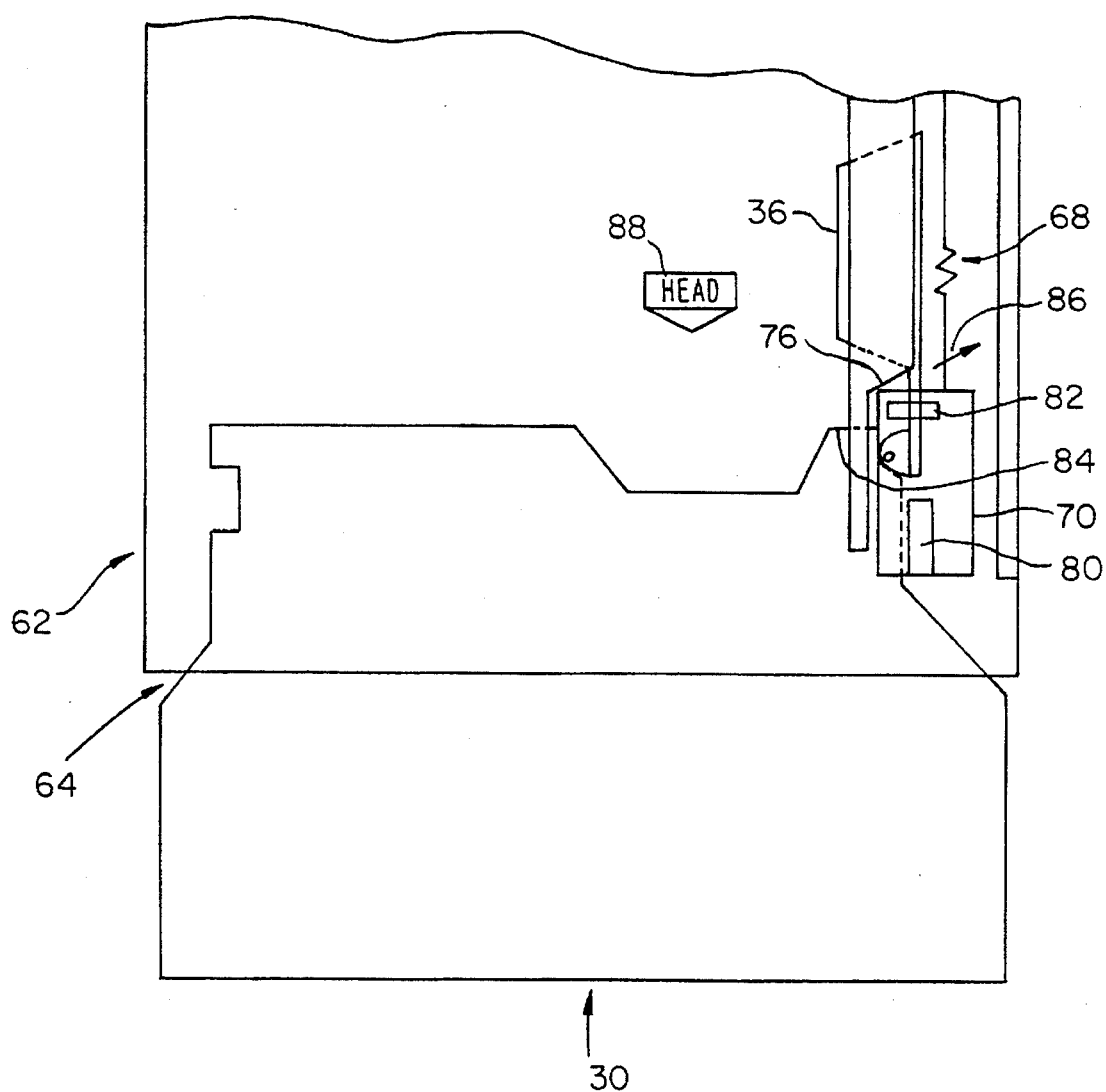
FIG. 8c is a view similar to FIG. 8b, but with the high capacity tape cartridge of FIG. 2 further inserted into the drive mouth.

FIG. 8c depicts a tape cartridge 30 that has been inserted to the extent that the cartridge door 36 is now fully open. However, the tape cartridge 30 is not yet fully inserted. The front wall 84 of the tape cartridge 30 now abuts against a second projection 82 of the slide 70, this second projection hereafter referred to as abutment 82. Further insertion of the tape cartridge 30 in the tape insertion direction 74 causes a moment to be applied in the direction of arrow 86. As seen in FIG. 11, when the front wall 84 pushes on the channel shoulder 76, the slide 70 rotates about a pivot point 73. (The pivot point is at the portion of the slide 70 which guides the slide 70 into the channel 72.) This disengages the slide 70 from the channel shoulder 76, freeing the slide 70 to move within the channel 72 against the force of the biasing device 68.

Figure 8D:
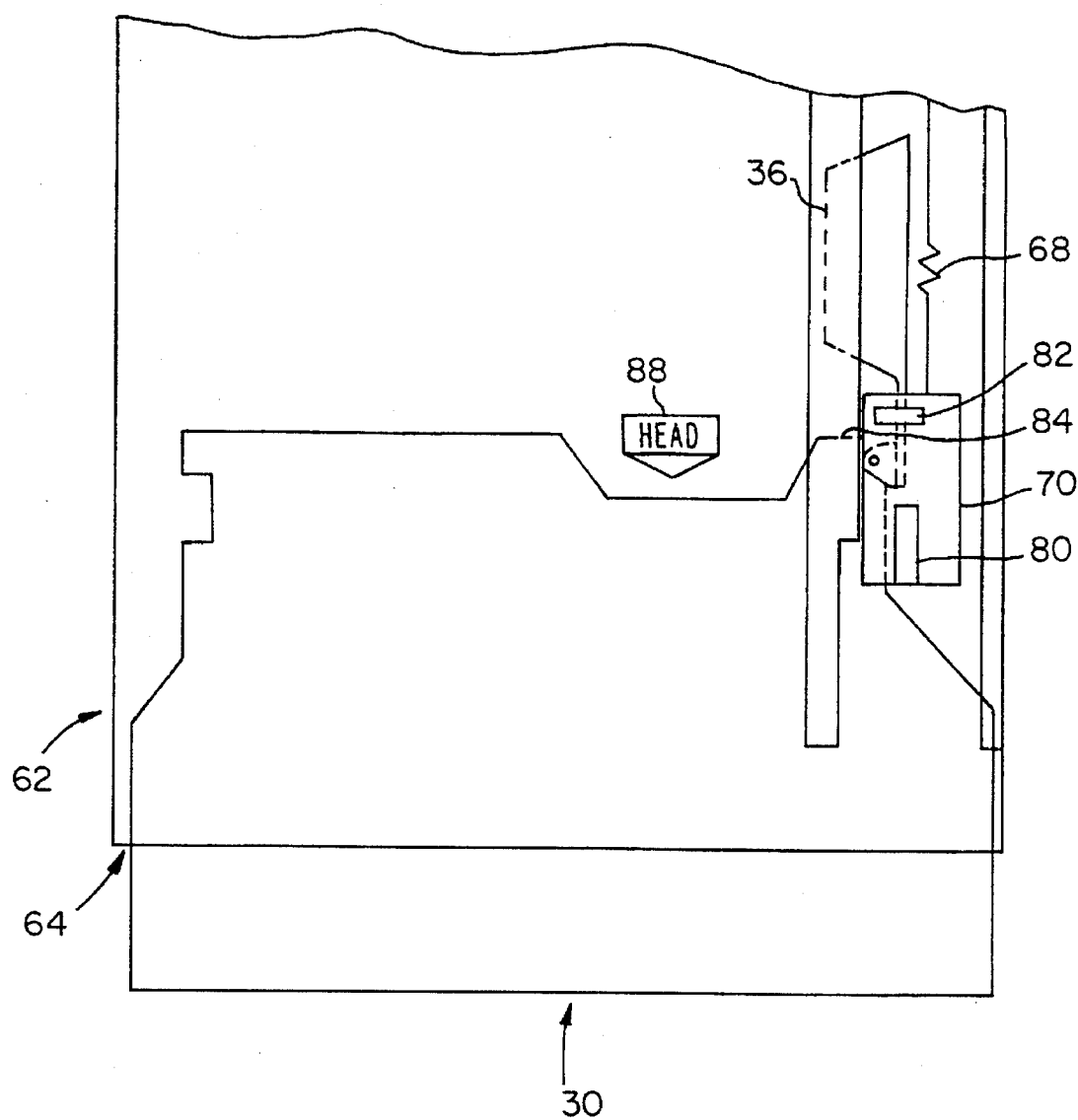
FIG. 8d is a view similar to FIG. 8c, but with the high capacity tape cartridge of FIG. 2 fully inserted into the drive mouth.
Figure 9A:
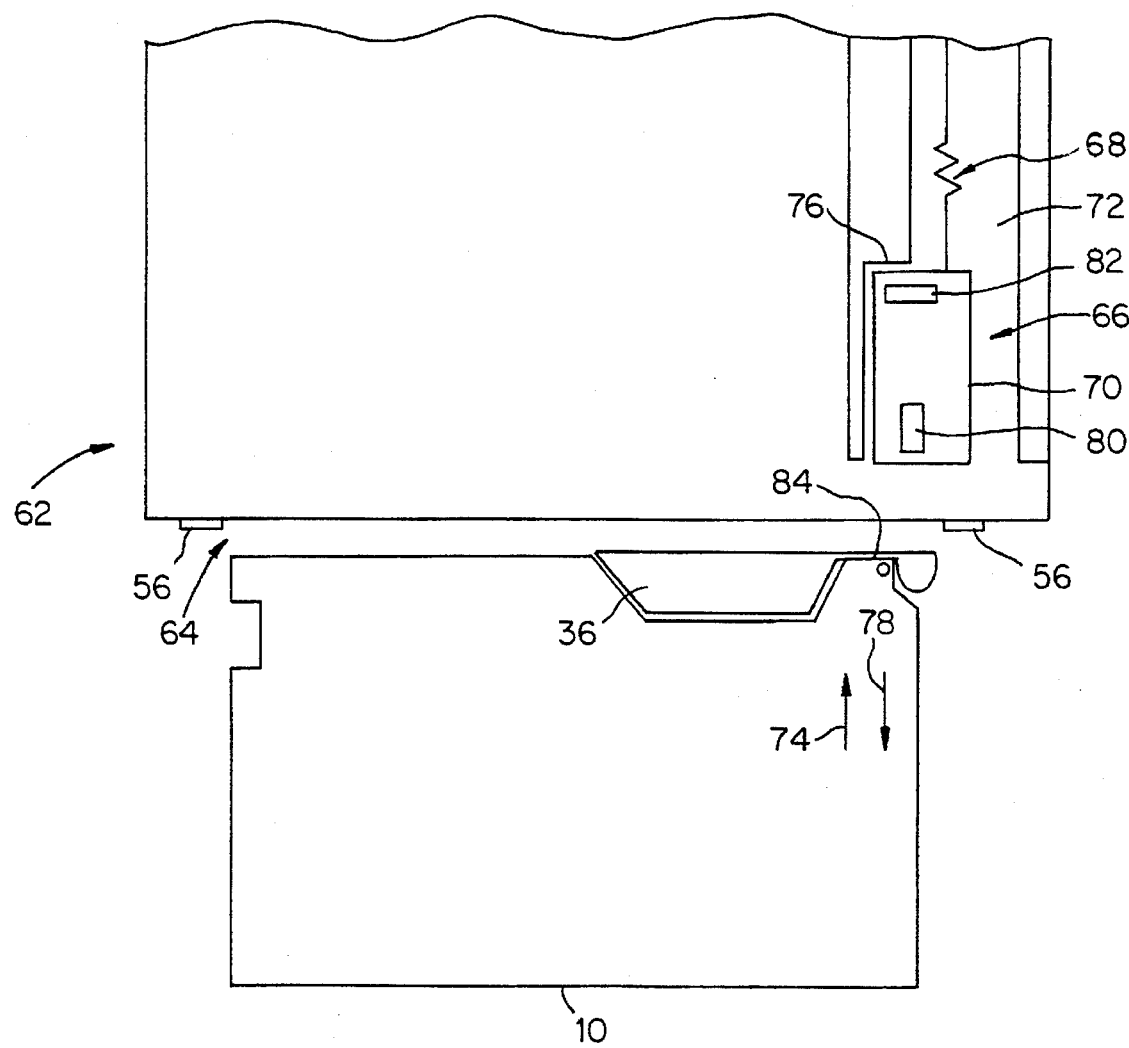
FIGS. 9a–9d are views similar to FIGS. 8a–8d, but depict the insertion of a standard capacity tape cartridge into a tape drive mechanism.
Figure 9B:
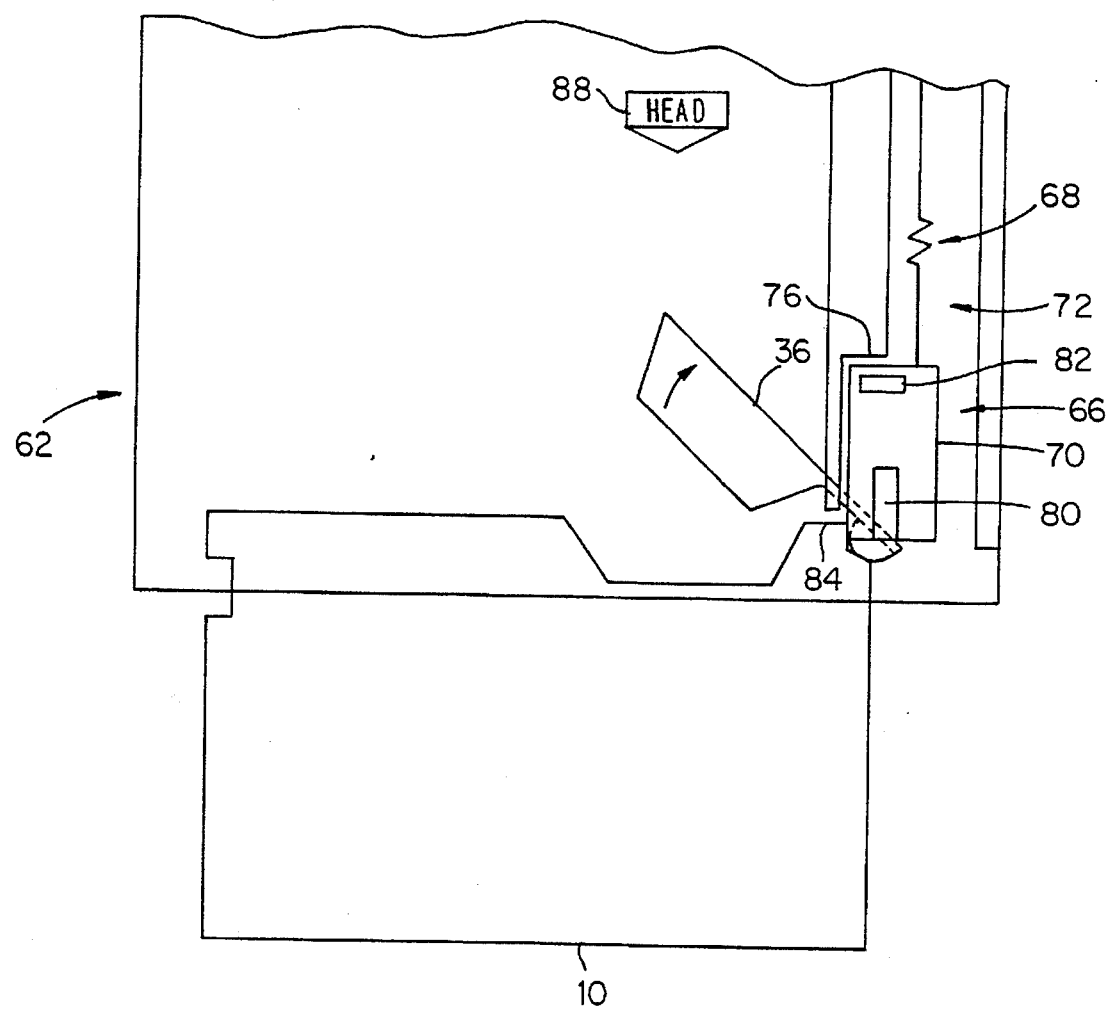
Figure 9C:
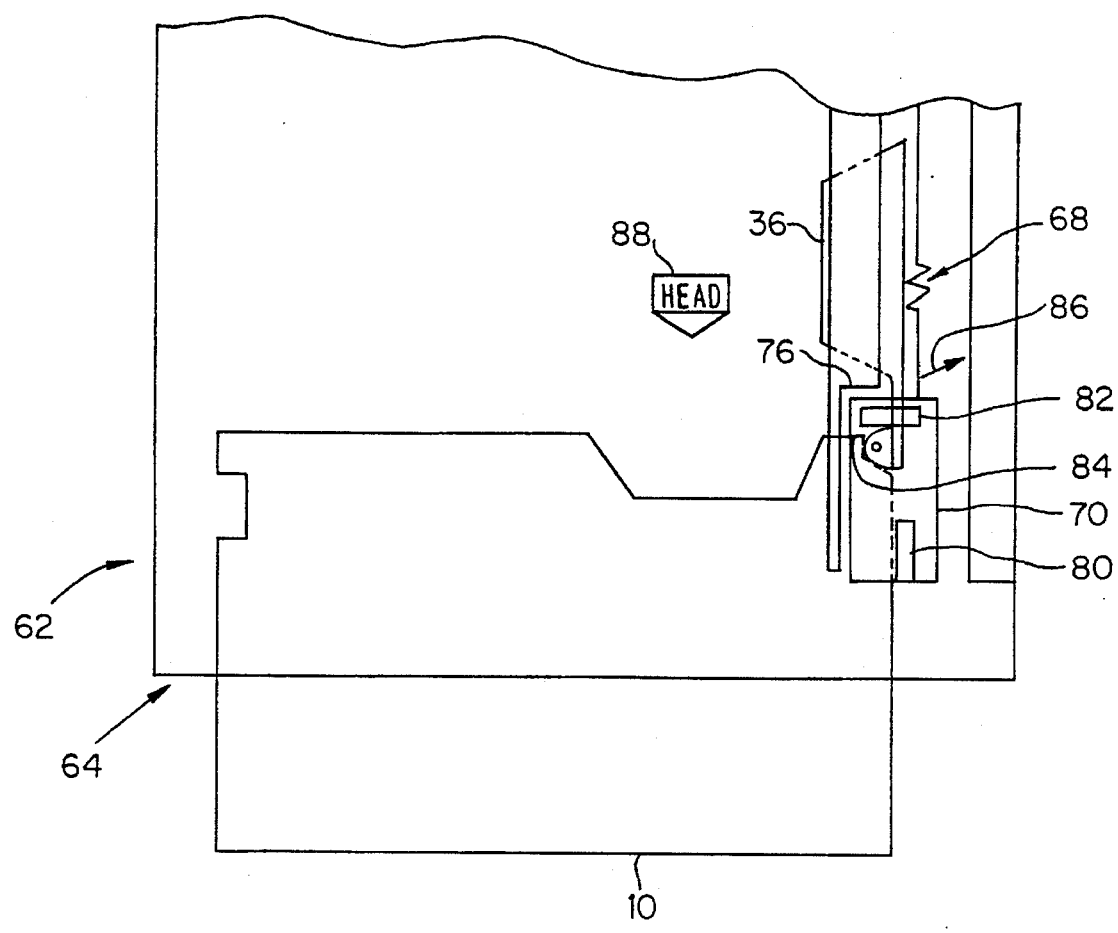
Figure 9D:
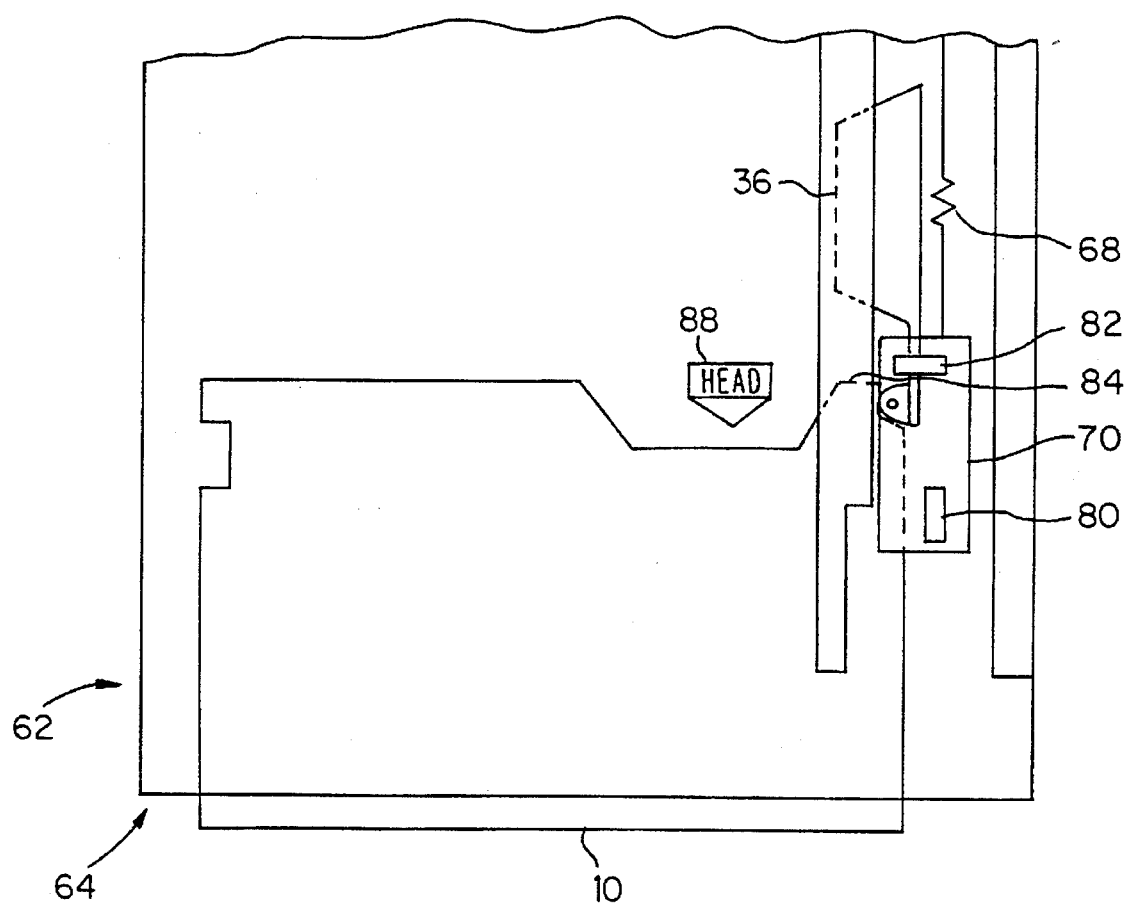

Complete insertion of the tape cartridge 30 pushes the slide 70 (through interaction of the front wall 84 with the abutment 82) in the channel 72 until the tape cartridge 30 is considered fully inserted and the slide 70 reaches its retracted position. This is depicted in FIG. 8d. With the cartridge door 36 open, and the tape cartridge 30 inserted to bring the tape in proximity to the head 88, recording or playback of the tape information is ready to occur.

Upon removal of the tape cartridge 30, the slide 70 is restored by the biasing device 68 to its extended position. Although a channel shoulder 76 is described in this exemplary embodiment, other embodiments of the invention use different arrangements for providing initial, frictional resistance to the movement of the slide 70, as one of ordinary skill in the art will recognize.

FIGS. 9a–9d depict the same tape drive mechanism 62 and insertion sequence as in FIGS. 8a–8d, but with a standard capacity tape cartridge 10 instead of a large capacity tape cartridge 30. Comparison of the two sets of figures makes apparent that the operation of the door opening mechanism 66 is the same for both types of cartridges 10, 30.

The tape drive of the present invention with a movable door opening mechanism thus allows both standard capacity tape cartridges and high capacity tape cartridges to be used in the same tape drive.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A tape drive having a door opening arrangement for opening a cartridge door of a tape cartridge inserted into the tape drive, comprising:

a drive mouth for receiving a tape cartridge inserted in a first direction into the drive mouth;

a door opening mechanism located at the drive mouth, the door opening mechanism being movable within the drive mouth in the first direction from an extended position to a retracted position and in a second direction opposite to the first direction, the door opening mechanism having a door opener that contacts a cartridge door upon initial insertion of a tape cartridge into the drive mouth, the door opener interacting with the cartridge door to open the cartridge door upon further insertion of a tape cartridge;

a biasing device coupled to the door opening mechanism to bias the door opening mechanism in the second direction towards the extended position and having a biasing force such that the door opening mechanism remains substantially in the extended position upon insertion of the tape cartridge into the drive mouth to open the cartridge door upon insertion of the tape cartridge and subsequently is overcome to permit movement of the door opening mechanism in the first direction towards the retracted position when the tape cartridge is inserted to an extent such that a wall of the tape cartridge pushes the door opening mechanism in the first direction.

2. The tape drive of claim 1, wherein the biasing device includes a spring coupled to the door opening mechanism.

3. The tape drive of claim 1, wherein the tape drive has a channel that extends along a tape insertion direction, and wherein the door opening mechanism includes a slide, coupled to the biasing device, and that is slidable within the channel, the door opener being mounted on the slide.

4. The tape drive of claim 3, wherein the slide has an abutment arranged on the slide to interact with a front wall of a tape cartridge upon insertion of a tape cartridge after the door opener opens the cartridge door.

5. The tape drive of claim 4, wherein the channel has a shoulder against which the slide abuts when the slide is in the extended position, the slide pushing away from the shoulder and along the channel by the interaction of the front wall of the tape cartridge with the abutment during insertion of the tape cartridge.

6. The tape drive of claim 5, further comprising a bezel having an outer guide conforming to the outline of a tape cartridge of a first size, the outer guide having shoulders separated by a width that accommodates a tape cartridge of a second size, smaller than the first size.

7. The tape drive of claim 6, wherein the bezel has a bezel door with guides that interact with tape cartridges of the first size to provide a longitudinal guide for guiding tape cartridges of the first and second sizes during insertion of the tape cartridges in the tape drive.

8. A tape drive comprising:

a drive mouth;

a movable door opening mechanism, located immediately within the drive mouth, for opening a cartridge door of tape cartridges inserted into the drive mouth such that the cartridge door is opened when the cartridge is at the drive mouth, the movable door opening mechanism remaining in a first position during insertion of a tape cartridge until a cartridge door of the tape cartridge is open, and moving to a second position during further insertion of the tape cartridge into the drive mouth.

9. The tape drive of claim 8, wherein the door opening mechanism includes a slide within the drive mouth, the slide being movable within the drive mouth in a first direction from the first position to a second position and in a second direction opposite to the first direction, the slide having a door opener that contacts a cartridge door upon initial insertion of a tape cartridge into the drive mouth, the door opener interacting with the cartridge door to open the cartridge door upon further insertion of a tape cartridge.

10. The tape drive of claim 9, wherein the door opening mechanism further includes a biasing device coupled to the slide to bias the slide in the second direction towards the first position and having a biasing force such that the slide remains substantially in the first position upon insertion of the tape cartridge to open the cartridge door and is overcome to permit movement of the door opener in the first direction towards the second position when the tape cartridge is inserted to an extent such that a wall of the tape cartridge pushes the slide in the first direction.

11. The tape drive of claim 10, wherein the slide includes an abutment that interacts with a front wall of a tape cartridge after a tape cartridge has been inserted to the extent that the cartridge door of the tape cartridge is open.

12. The tape drive of claim 11, further comprising a channel that extends along the first direction and in which the slide is slidable.

13. The tape drive of claim 12, wherein the channel has a frictional resistance that resists movement of the slide in the first direction, in addition to the biasing device, until the cartridge door is open and the front wall of the tape cartridge abuts the abutment and the tape cartridge is further inserted in the first direction.

14. The tape drive of claim 13, wherein the frictional resistance is a shoulder in the channel, against which the slide abuts when the slide is in the first position.

15. A method of receiving a tape cartridge in a tape drive, comprising the steps of:

initially inserting a tape cartridge within a drive mouth of a tape drive such that a cartridge door of the tape cartridge contacts a door opener at the drive mouth on a movable door opening mechanism;

continuing inserting the tape cartridge in the tape drive and against the door opener to open the cartridge door, while maintaining the door opening mechanism in its original position; and further inserting the tape cartridge in the tape drive such that the tape cartridge moves the door opening mechanism to accommodate the tape cartridge in the tape drive.

16. The method of claim 15, wherein the step of maintaining includes biasing the door opening mechanism in a direction opposite to a direction of insertion of the tape cartridge.

17. The method of claim 16, wherein the step of maintaining includes frictionally resisting movement of the door opening mechanism in the first direction, the frictional resistance being overcome during the step of further inserting by application of force transmitted in the direction of insertion via the tape cartridge to the door opening mechanism.

18. The method of claim 17, wherein the step of initially inserting includes guiding the insertion of a tape cartridge into the tape drive through a bezel having an outer guide that conforms to an outline of a tape cartridge of a first size, and has shoulders that are separated by a distance to accommodate tape cartridges of a second size, smaller than the first size.

19. The method of claim 18, wherein the step of guiding further includes longitudinally guiding the insertion of tape cartridges into the tape drive with guides on a bezel door that swings open upon initial insertion of tape cartridges to align the guides along the direction of insertion.

\* \* \* \* \*